US007756858B2

(12) United States Patent
Lindblad et al.

(10) Patent No.: US 7,756,858 B2
(45) Date of Patent: *Jul. 13, 2010

(54) PARENT-CHILD QUERY INDEXING FOR XML DATABASES

(75) Inventors: Christopher Lindblad, Berkeley, CA (US); Paul Pedersen, Palo Alto, CA (US)

(73) Assignee: Mark Logic Corporation, San Carlos, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 11/567,676

(22) Filed: Dec. 6, 2006

(65) Prior Publication Data

US 2007/0168327 A1    Jul. 19, 2007

Related U.S. Application Data

(63) Continuation of application No. 10/462,019, filed on Jun. 13, 2003, now Pat. No. 7,171,404.

(60) Provisional application No. 60/389,066, filed on Jun. 13, 2002.

(51) Int. Cl.
*G06F 17/30* (2006.01)
(52) U.S. Cl. .................................................. 707/716
(58) Field of Classification Search ........................ None
See application file for complete search history.

(56) References Cited

U.S. PATENT DOCUMENTS 5,493,678 A   2/1996  Arcuri et al.

| 5,752,243 | A |   | 5/1998  | Reiter et al. |
|-----------|---|---|---------|---------------|
| 5,778,378 | A | * | 7/1998  | Rubin ............... 707/103 R |
| 5,892,513 | A |   | 4/1999  | Fay |
| 5,970,490 | A |   | 10/1999 | Morgenston |
| 6,134,344 | A |   | 10/2000 | Burges |
| 6,199,063 | B1|   | 3/2001  | Colby et al. |
| 6,334,125 | B1|   | 12/2001 | Johnson et al. |

(Continued)

OTHER PUBLICATIONS

Calvanese, et al.; "Answering Regular Path Queries Using Views;" Proceedings of the 16th International Conference on Data Engineering, Feb. 28-Mar. 3, 2000, San Diego, California, USA; Feb. 29, 2000; pp. 389-398; IEEE Computer Society 2000.

(Continued)

*Primary Examiner*—Neveen Abel Jalil
*Assistant Examiner*—Mark Andrew X Radtke
(74) *Attorney, Agent, or Firm*—Philip H. Albert; Townsend and Townsend and Crew, LLP

(57) ABSTRACT

A method for processing queries for a document of elements is provided. The document includes a plurality of subsections where each subsection includes at least a portion of elements in the document. The method comprises: receiving a query for a path of elements in the document of elements; determining a plurality of step queries from the query, each step query including at least a part of the path of elements; for each step query in the plurality of step queries, determining one or more subsections that include elements that correspond to a step query; and determining at least one subsection that includes the path of elements of the query. A result for the query is generated using the at least one subsection.

20 Claims, 13 Drawing Sheets

FIG. 9

U.S. PATENT DOCUMENTS

| | | | |
|---|---|---|---|
| 6,366,934 B1 * | 4/2002 | Cheng et al. | 715/210 |
| 6,418,448 B1 | 7/2002 | Sarkar | |
| 6,421,656 B1 * | 7/2002 | Cheng et al. | 707/2 |
| 6,421,687 B1 | 7/2002 | Klostermann | |
| 6,438,540 B2 | 8/2002 | Nasr et al. | |
| 6,457,018 B1 * | 9/2002 | Rubin | 707/4 |
| 6,510,406 B1 | 1/2003 | Marchisio | |
| 6,519,597 B1 * | 2/2003 | Cheng et al. | 707/10 |
| 6,529,905 B1 | 3/2003 | Bray et al. | |
| 6,584,459 B1 * | 6/2003 | Chang et al. | 707/3 |
| 6,604,100 B1 | 8/2003 | Fernandez et al. | |
| 6,635,089 B1 | 10/2003 | Burkett et al. | |
| 6,654,734 B1 | 11/2003 | Mani et al. | |
| 6,678,705 B1 | 1/2004 | Berchtold et al. | |
| 6,684,204 B1 | 1/2004 | Lal | |
| 6,704,736 B1 | 3/2004 | Rys et al. | |
| 6,374,202 B1 | 4/2004 | Robinson | |
| 6,721,723 B1 | 4/2004 | Gibson et al. | |
| 6,721,727 B2 | 4/2004 | Chau et al. | |
| 6,738,762 B1 * | 5/2004 | Chen et al. | 707/3 |
| 6,738,767 B1 | 5/2004 | Chung et al. | |
| 6,745,206 B2 | 6/2004 | Mandler et al. | |
| 6,745,208 B2 | 6/2004 | Berg et al. | |
| 6,751,622 B1 | 6/2004 | Puri et al. | |
| 6,751,659 B1 | 6/2004 | Fenger et al. | |
| 6,757,646 B2 | 6/2004 | Marchisio | |
| 6,785,673 B1 | 8/2004 | Fernandez et al. | |
| 6,785,685 B2 | 8/2004 | Soetarman et al. | |
| 6,799,184 B2 | 9/2004 | Bhatt et al. | |
| 6,804,677 B2 | 10/2004 | Shadmon | |
| 6,816,864 B2 | 11/2004 | Deuser et al. | |
| 6,826,726 B2 | 11/2004 | Hsing et al. | |
| 6,859,217 B2 | 2/2005 | Robertson et al. | |
| 6,859,455 B1 | 2/2005 | Yazdani et al. | |
| 6,882,995 B2 | 4/2005 | Nasr et al. | |
| 6,889,226 B2 | 5/2005 | O'Neill et al. | |
| 6,889,926 B1 | 5/2005 | O'Neill et al. | |
| 6,901,410 B2 * | 5/2005 | Marron et al. | 707/104.1 |
| 6,912,538 B2 | 6/2005 | Stapel et al. | |
| 6,934,712 B2 | 8/2005 | Kiernan et al. | |
| 6,966,027 B1 | 11/2005 | Krasinski | |
| 7,013,311 B2 | 3/2006 | Hui et al. | |
| 7,028,028 B1 | 4/2006 | Balmin et al. | |
| 7,089,532 B2 * | 8/2006 | Rubin | 717/116 |
| 7,171,404 B2 * | 1/2007 | Lindblad et al. | 707/3 |
| 7,181,489 B2 | 2/2007 | Lection | |
| 7,275,056 B2 * | 9/2007 | Cheng et al. | 707/4 |
| 2001/0037345 A1 | 11/2001 | Kiernan et al. | |
| 2001/0049675 A1 | 12/2001 | Mandler et al. | |
| 2002/0010714 A1 | 1/2002 | Hetherington | |
| 2002/0023113 A1 | 2/2002 | Hsing et al. | |
| 2002/0029229 A1 | 3/2002 | Jakopac et al. | |
| 2002/0030703 A1 | 3/2002 | Robertson et al. | |
| 2002/0038319 A1 | 3/2002 | Yahagi | |
| 2002/0059204 A1 | 5/2002 | Harris | |
| 2002/0073119 A1 | 6/2002 | Richard | |
| 2002/0085002 A1 | 7/2002 | Lamping et al. | |
| 2002/0087571 A1 | 7/2002 | Stapel et al. | |
| 2002/0087596 A1 | 7/2002 | Lewontin | |
| 2002/0120598 A1 | 8/2002 | Shadmon et al. | |
| 2002/0123993 A1 * | 9/2002 | Chau et al. | 707/5 |
| 2002/0133497 A1 | 9/2002 | Draper et al. | |
| 2002/0170070 A1 | 11/2002 | Rising et al. | |
| 2003/0009472 A1 | 1/2003 | Azami et al. | |
| 2003/0028557 A1 | 2/2003 | Walker et al. | |
| 2003/0110150 A1 | 6/2003 | O'Neil et al. | |
| 2003/0131051 A1 | 7/2003 | Lection | |
| 2003/0167445 A1 | 9/2003 | Su et al. | |
| 2003/0204515 A1 | 10/2003 | Shadmon et al. | |
| 2003/0212662 A1 | 11/2003 | Shin et al. | |
| 2003/0233344 A1 | 12/2003 | Kuno et al. | |
| 2004/0060006 A1 | 3/2004 | Lindblad et al. | |
| 2004/0103073 A1 | 5/2004 | Blake et al. | |
| 2004/0103105 A1 | 5/2004 | Lindblad et al. | |
| 2005/0055336 A1 | 3/2005 | Hui et al. | |
| 2007/0136250 A1 | 6/2007 | Lindblad et al. | |

OTHER PUBLICATIONS

Chen et al.; "ACE-XQ: A CachE-aware XQuery Answering System;" Proceedings of the Acm Sigmod Associated Workshop On The Web and Databases (WEBDB'02); Jun. 6, 2002; 6 pages; Retrieved from the Internet: at URL:http://web.cs.wpi.edu/~lichen/papers/webdb02-acexq.ps>; printed on Oct. 29, 2009.

Chen et al.; "XCache—A Semantic Caching System for XML Queries;" SIGMOD 2002. Proceedings of the ACM SIGMOD International Conference on Management of Data; Madison, WI, Jun. 4-6, 2002; [Proceedings of the ACM SIGMOD International Conference on Management of Data], New York, NY : ACM, US, Jun. 3, 2002; p. 1.

He et al.; "Warp-Edge Optimization in XPath;" Advances in Object-Oriented Information Systems; Proceedings of EWIS 2002; Montpellier, France; Sep. 2002; Lecture Notes in Computer Science; pp. 187-196; vol. 2426; Springer-Verlag; Berlin, Germany.

Hristidis, et al.; "Semantic Caching of XML Databases;" Proceedings of The ACM Sigmod Associated Workshop on the Web and Databases; Jun. 6-7, 2002; 6 pages.

Jun, et al.; "Greedy Cached Query Rewriting in Content-Oriented XML Web Engine;" Parallel and Distributed Processing Symposium., Proceedings International, IPDPS 2002, Abstracts and CD-Rom; Lauderdale, FL, USA; Apr. 15-19, 2002; pp. 218-223; IEEE Computer Society; Los Alamitos, CA, USA.

Kanne, et al.; "Efficient storage of XML data;" Proceedings of the 16$^{th}$ International Conference on Data Engineering (ICDE'2000); San Diego, CA; Feb. 29-Mar. 3, 2000; 20 pages; IEEE Computer Society; Los Alamitos, CA, USA.

Marron, et al.; "Efficient Cache Answerability for XPath Queries;" Lecture Notes in Computer Science; Jan. 1, 2003; pp. 183-200; vol. 2590/2008; Springer Berlin/Heidelberg.

Papakonstantinou, et al.; Query Rewriting for Semistructured Data; International Conference on Management of Data archive; Proceedings of the 1999 ACM SIGMOD International Conference on Management of Data; Philadelphia, Pennsylvania, United States; 1999; pp. 455-466.

Papakonstantinou, et al.; "Query Rewriting using Semistructured Views;" Proceedings of The ACM International Conference on Management of Data; International Conference on Management of Data archive; Proceedings of the 1999 ACM SIGMOD International Conference on Management of Data; Philadelphia, Pennsylvania, United States; 1999; 5 pages.

Supplemental European Search Report for EP Patent Application No. 03739138, mailed Nov. 12, 2009; 5 pages.

Kanne, Carl-Christian et al., "Efficient storage of XML data"; Feb. 29-Mar. 3, 2000, *Proceedings of the 16th Annual International Conference on Data Engineering*, ICDE'2000; vol. Conf. 16, pp. 1-20.

* cited by examiner

```
<citation>
    <title>Cerisent XQE</title>
    <author>
        <last>Pedersen</last>
        <first>Paul</first>
    </author>
    <abstract>  The document describes an XML
                search and query system
    </abstract>
</citation>
```
FIG. 1
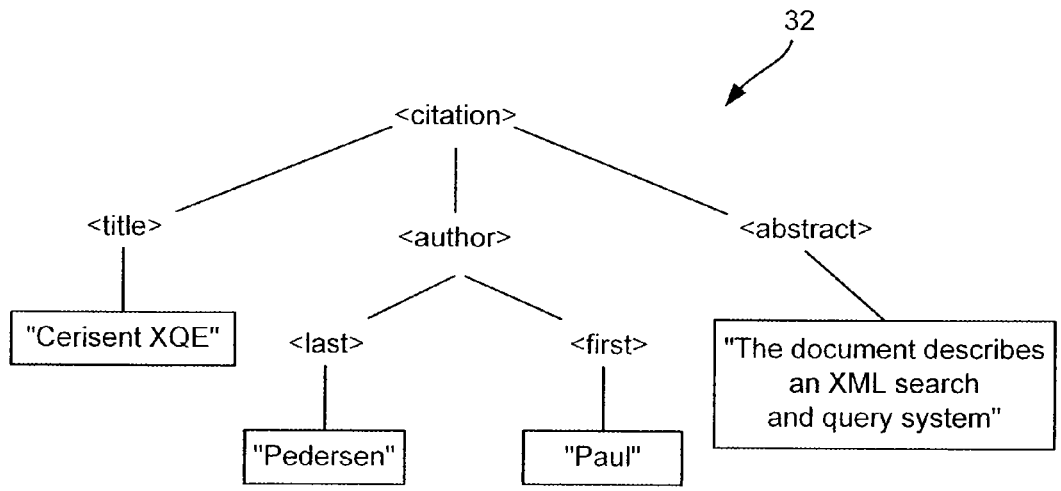
FIG. 2A
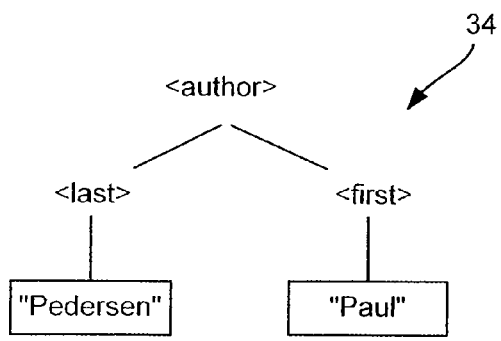
FIG. 2B

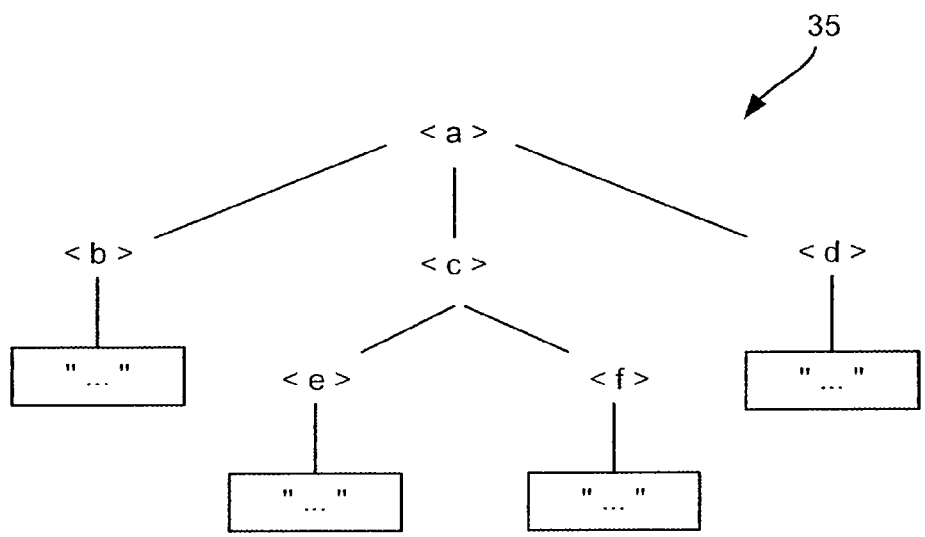
FIG. 3
< b   K = "v" > node text</b>
FIG. 4A
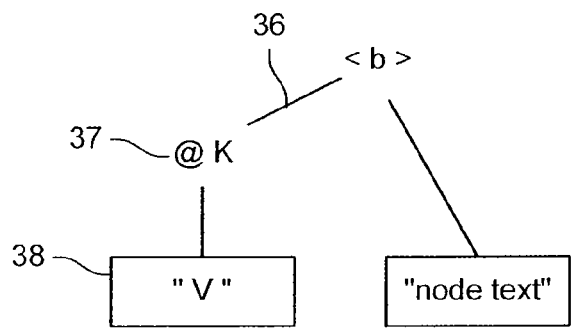
FIG. 4B

| Step Queries 1006 | Frequency | Score |
|---|---|---|
| a | 2 | .22 |
| b | 2 | .22 |
| c | 1 | .11 |
| c/a | 2 | .22 |
| a/b | 2 | .22 |

FIG. 14A

| Top Queries 1100 | Frequency | Score |
|---|---|---|
| b | 1 | .08 |
| c | 1 | .08 |
| d | 1 | .08 |
| e | 2 | .17 |
| @E | 1 | .08 |
| c/b | 1 | .08 |
| c/d | 1 | .08 |
| d/e | 2 | .17 |
| d/@E | 1 | .08 |
| b/c | 1 | .08 |

FIG. 14B

| Top Queries 1100 | Frequency | Score |
|---|---|---|
| a | 2 | .18 |
| b | 3 | .27 |
| c | 1 | .09 |
| a/b | 2 | .18 |
| c/a | 2 | .18 |
| c/b | 1 | .09 |

FIG. 14C

| Top Queries 1100 | Frequency | Score |
|---|---|---|
| c | 1 | .13 |
| d | 1 | .13 |
| e | 2 | .25 |
| c/d | 1 | .13 |
| c/e | 1 | .13 |
| d/e | 1 | .13 |
| e/c | 1 | .13 |

FIG. 14D

| Top Queries 1100 | Frequency | Score |
|---|---|---|
| a | 1 | .09 |
| b | 3 | .27 |
| @D | 1 | .09 |
| a/b | 3 | .27 |
| b/c | 2 | .18 |
| b/@D | 1 | .09 |

FIG. 14E

False Positive

Positive

PARENT-CHILD QUERY INDEXING FOR XML DATABASES

CROSS-REFERENCES TO RELATED APPLICATIONS

This application is a continuation application of and claims priority to U.S. Non-Provisional Application No. 10/462,019, filed on Jun. 13, 2003, entitled "PARENT-CHILD QUERY INDEXING FOR XML DATABASES, which claims the benefit of U.S. Provisional Application No. 60/389,066, filed Jun. 13, 2002, entitled "PARENT-CHILD QUERY INDEXING FOR XML DATABASES," the entire disclosures of which are herein incorporated by reference for all purposes. The present disclosures are related to the following commonly assigned co-pending U.S. Patent Applications:

U.S. patent application Ser. No. 10/462,100, filed Jun. 13, 2003, entitled "SUBTREE-STRUCTURED XML DATABASE" (hereinafter "Lindblad I-A");

U.S. patent application Ser. No. 10/462,023, filed Jun. 13, 2003, entitled "XML DB TRANSACTIONAL UPDATE SYSTEM" (hereinafter "Lindblad III-A"); and U.S. patent application Ser. No. 10/461,935, filed Jun. 13, 2003, entitled "XML DATABASE MIXED STRUCTURAL-TEXTUAL CLASSIFICATION SYSTEM" (hereinafter "Lindblad IV-A");

The respective disclosures of these applications are incorporated herein by reference for all purposes.

BACKGROUND OF THE INVENTION

The present invention generally relates to accessing data and more specifically to retrieving elements of documents using step queries generated from a query.

Many languages, such as Extensible Markup Language (XML), define rules that are used for structuring data. An XML document is created using the rules to structure data and includes two parts: the marked up document and the document schema. The marked up part of the document encodes a description of the document's storage layout and logical structure. The schema part specifies constraints that define XML document structures.

XML documents are made up of storage units called elements, which may be nested to form a hierarchical structure. An element may contain either parsed or unparsed data. Parsed data is made up of characters, some of which form character data, and some of which form the markup; unparsed data is data in its native format. Also, XML elements may have associated attributes, which may be referred to as name-value pairs. Elements and attributes are described in XML schema where the schema includes, for each element that may occur in the document, a name, the type, the set of attributes, and the set of allowable constituent elements. The relations are represented in a graph with one vertex for each element name, and one edge from an element to each possible constituent.

In managing XML documents, retrieving elements in the documents for reading or reformatting is often necessary. Accordingly, several query languages have been proposed for searching for and retrieving elements in the XML documents. For example, XQuery, a language derived from an XML query language Quilt and borrowing features from other languages, including XPath, is used for accessing elements in an XML document. XQuery accesses an element using a feature from XPath called an XPath location path expression, which specifies a pattern of elements within the XML document. For example, a query may be of the form A/B/C/D, and is interpreted to specify a pattern of the elements A, B, C, and D within the structure of the XML document. In order to find the desired element D, a system traces the hierarchy of the XML document. The system finds in order, all instances of the element A, all instances of the element B related to element A, all instances of the element C related to the A/B group, and all instances of the element D related to the A/B/C group. Thus, the system processes the XQuery command sequentially, starting from the first element and then to each subsequent element. This method of accessing elements in an XML document becomes time consuming and requires extensive computing power, especially when an element is deeply nested in a hierarchical XML document or a query includes a long path of elements.

BRIEF SUMMARY OF THE INVENTION

In one embodiment of the present invention, a method for processing queries for a document of elements is provided. The document includes a plurality of subsections where each subsection includes at least a portion of elements in the document. The method comprises: receiving a query for a path of elements in the document of elements; determining a plurality of step queries from the query, each step query including at least a part of the path of elements; for each step query in the plurality of step queries, determining one or more subsections that include elements that correspond to a step query; and determining at least one subsection that includes the path of elements of the query. In one embodiment, a result for the query is generated using the at least one subsection.

A further understanding of the nature and advantages of the invention herein may be realized by reference of the remaining portions in the specifications and the attached drawings.

BRIEF DESCRIPTION OF THE DRAWINGS

FIG. 1 is an illustration of a simple XML document including text and markup.

FIG. 2 is a schematic representation of the XML document shown in FIG. 1; FIG. 2A illustrates a complete representation the XML document and FIG. 2B illustrates a subtree of the XML document.

FIG. 3 is a schematic representation of a more concise XML document.

FIG. 4 illustrates a portion of an XML document that includes tags with attributes; FIG. 4A shows the portion in XML format; FIG. 4B is a schematic representation of that portion in graphical form.

FIGS. 14A-14E depict PostingList structures for each subtree according to one embodiment of the present invention.

DETAILED DESCRIPTION OF THE INVENTION

Figure 5:
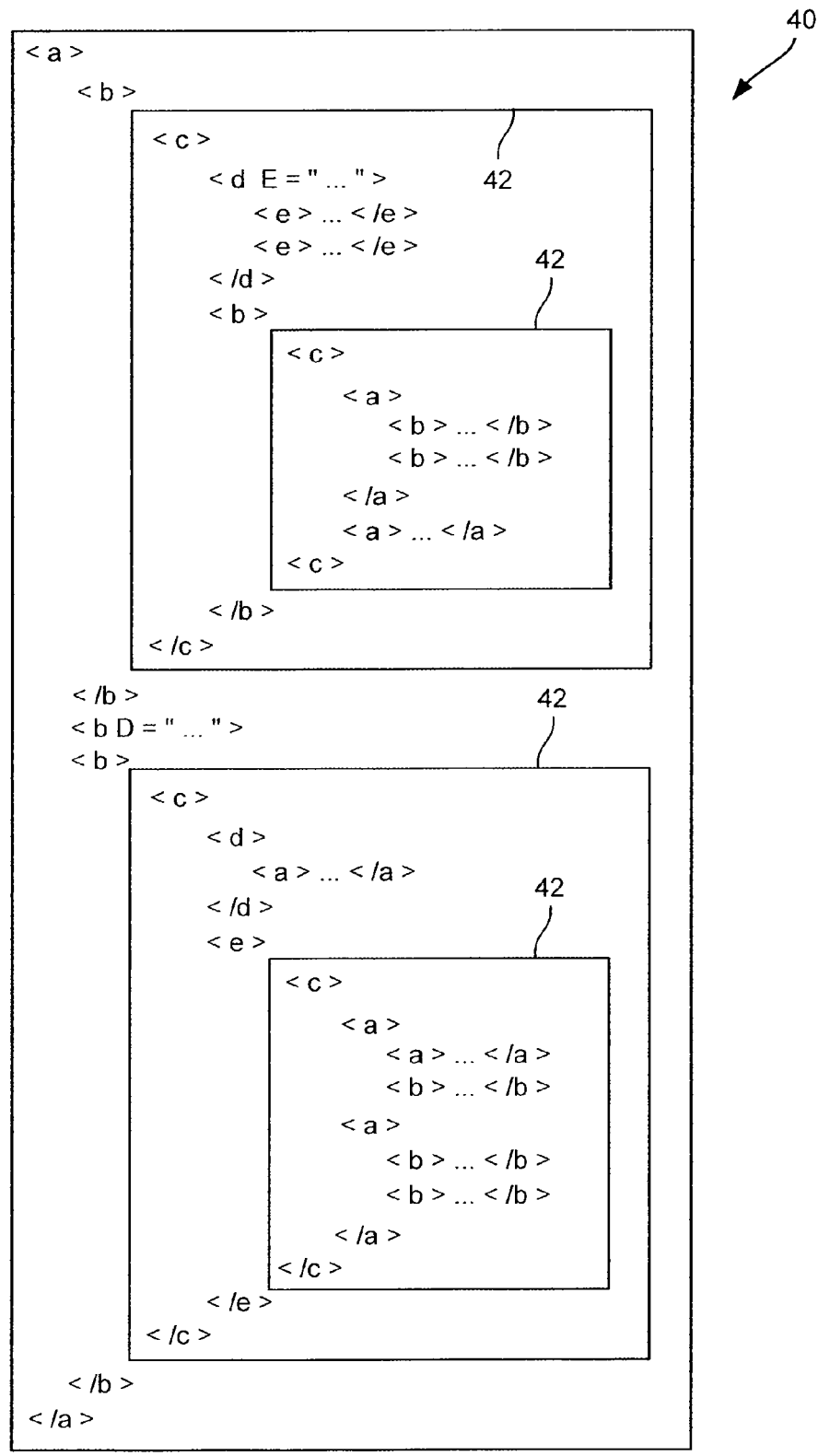
FIG. 5 shows a more complex example of an XML document, having attributes and varying levels.

This detailed description illustrates some embodiments of the invention and variations thereof, but should not be taken as a limitation on the scope of the invention. In this description, structured documents are described, along with their processing, storage and use, with XML being the primary example. However, it should be understood that the invention might find applicability in systems other than XML systems, whether they are later-developed evolutions of XML or entirely different approaches to structuring data.

Subtree Storage

Subtree storage is described in this section, with following sections describing apparatus, methods, structures and the like that might use and store subtrees. Subtree storage is explained with reference to a simple example, but it should be understood that such techniques are equally applicable to more complex examples.

FIG. 1 illustrates an XML document 30, including text and markup. FIG. 2A illustrates a schematic representation 32 of XML document 30, wherein schematic representation 12 is a shown as a tree (a connected acyclic simple directed graph) with each node of the tree representing an element of the XML document or an element's content, attribute, the value, etc.

In a convention used for the figures of the present application, directed edges are oriented from an initial node that is higher on the page than the edge's terminal node, unless otherwise indicated. Nodes are represented by their labels, often with their delimiters. Thus, the root node in FIG. 2A is a "citation" node represented by the label delimited with "< >". Data nodes are represented by rectangles. In many cases, the data node will be a text string, but other data node types are possible. In many XML files, it is possible to have a tag with no data (e.g., where a sequence such as "<tag></tag>" exists in the XML file). In such cases, the XML file can be represented as shown in FIG. 2A but with some nodes representing tags being leaf nodes in the tree. The present invention is not limited by such variations, so to focus explanations, the examples here assume that each "tag" node is a parent node to a data node (illustrated by a rectangle) and a tag that does not surround any data is illustrated as a tag node with an out edge leading to an empty rectangle. Alternatively, the trees could just have leaf nodes that are tag nodes, for tags that do not have any data.

As used herein, "subtree" refers to a set of nodes with a property that one of the nodes is a root node and all of the other nodes of the set can be reached by following edges in the orientation direction from the root node through zero or more non-root nodes to reach that other node. A subtree might contain one or more overlapping nodes that are also members of other "inner" or "lower" subtrees; nodes beyond a subtree's overlapping nodes are not generally considered to be part of that subtree. The tree of FIG. 2A could be a subtree, but the subtree of FIG. 2B is more illustrative in that it is a proper subset of the tree illustrated in FIG. 2A.

To simplify the following description and figures, single letter labels will be used, as in FIG. 3. Note that even with the shorted tags, tree 35 in FIG. 3 represents a document that has essentially the same structure as the document represented by the tree of FIG. 2A.

Some nodes may contain one or more attributes, which can be expressed as (key, value) pairs associated with nodes. In graph theory terms, the directed edges come in two flavors, one for a parent-child relationship between two tags or between a tag and its data node, and one for linking a tag with an attribute node representing an attribute of that tag. The latter is referred to herein as an "attribute edge". Thus, adding an attribute (name, value) pair to an XML file would map to adding an attribute edge and an attribute node, followed by an attribute value node to a tree representing that XML file. A tag node can have more than one attribute edge (or zero attribute edges). Attribute nodes have exactly one descendant node, a value node, which is a leaf node and a data node, the value of which is the value from the attribute pair.

In the tree diagrams used herein, attribute edges sometimes are distinguished from other edges in that the attribute name is indicated with a preceding "@". FIG. 4A illustrates a portion of XML markup wherein a tag b has an attribute name of "K" and a value of "V". FIG. 4B illustrates a portion of a tree that is used to represent the XML markup shown in FIG. 4A, including an attribute edge 36, an attribute node 37 and a value node 38. In some instances, tag nodes and attribute nodes are treated the same, such as indexing sequences and the like, but other times are treated differently. To easily distinguish tag nodes and attribute nodes in the illustrated trees, tag nodes are delimited with surrounding angle brackets ("<>"), while attribute nodes are be limited with an initial "@".

Figure 6:
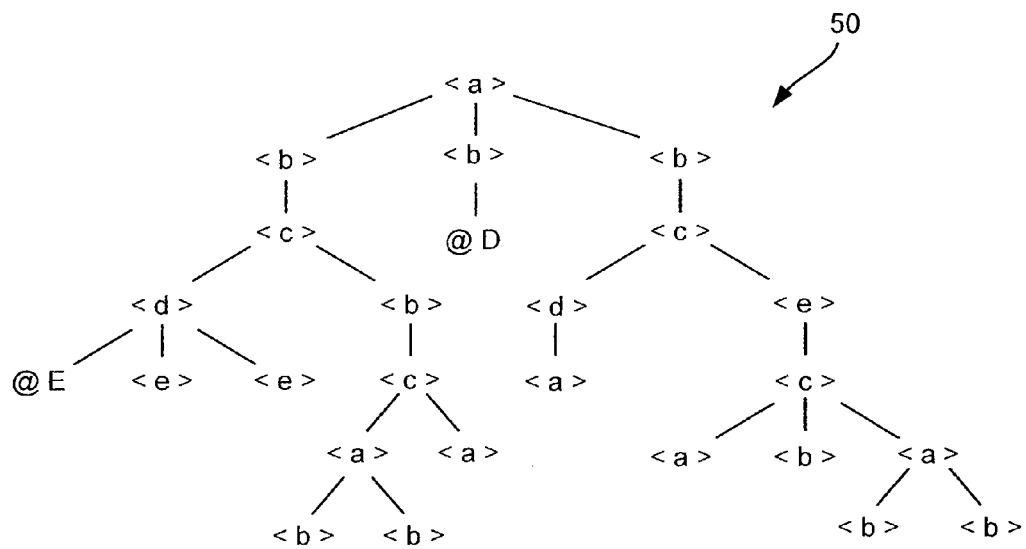
FIG. 6 is a schematic representation of the XML document shown in FIG. 5, omitting data nodes.

FIG. 5 et seq. illustrate a more complex example, with multiple levels of tags, some having attributes. FIG. 5 shows a multi-level XML document 40. As is explained later below, FIG. 5 also includes indications 42 of where multi-level XML document 40 might be decomposed into smaller portions. FIG. 6 illustrates a tree 50 that schematically represents multi-level XML document 40 (with a data nodes omitted).

Figure 7:
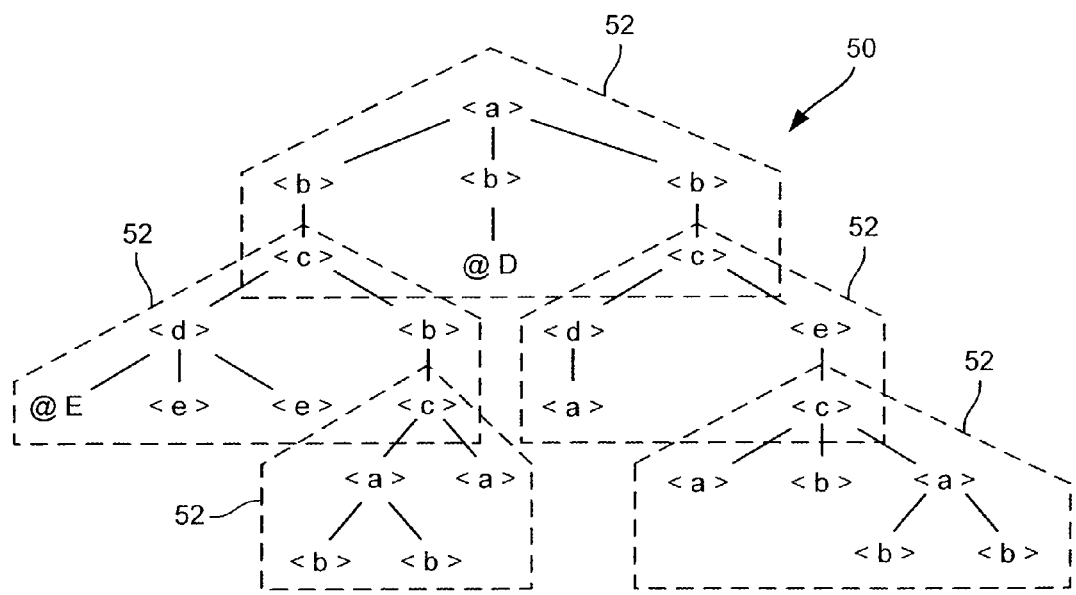
FIG. 7 illustrates a possible decomposition of the XML document illustrated in FIGS. 5-6.

FIG. 7 shows one decomposition of tree 50 with subtree borders 52 that correspond to indications 42. Each subtree border 52 defines a subtree; each subtree has a subtree root node and zero or more descendant nodes and some of the descendant nodes might in turn be subtree root nodes for lower subtrees. In this example, the decomposition points are entirely determined by tag labels (e.g., each tag with a label "c" becomes a root node for a separate subtree, with the original tree root node being the root node of a subtree extending down to the first instances of tags having tag labels "c"). In other examples, decomposition might be done using a different set of rules. For example, the decomposition rules might be to break at either a "c" tag or an "f" tag, break at a "d" tag when preceded by an "r" tag, etc. Decomposition rules need not be specific to tag names, but can specify breaks upon occurrence of other conditions, such as reaching a certain size of subtree or subtree content. Some decomposition rules might be parameterized where parameters are supplied by users and/or administrators (e.g., "break whenever a tag is encountered that matches a label the user specifies", or more generally, when a user-specified regular expression or other condition occurs).

Note from FIG. 7 that subtrees overlap. In a subtree decomposition process, such as one prior to storing subtrees in a database or processing subtrees, it is often useful to have nonoverlapping subtree borders. Assume that two subtrees overlap as they both include a common node. The subtree that contains the common node and parent(s) of the common node is referred to herein as the upper overlapping subtree, while the subtree that contains the common node and child(ren) of the common node is referred to herein as the lower overlapping subtree.

Figure 8:
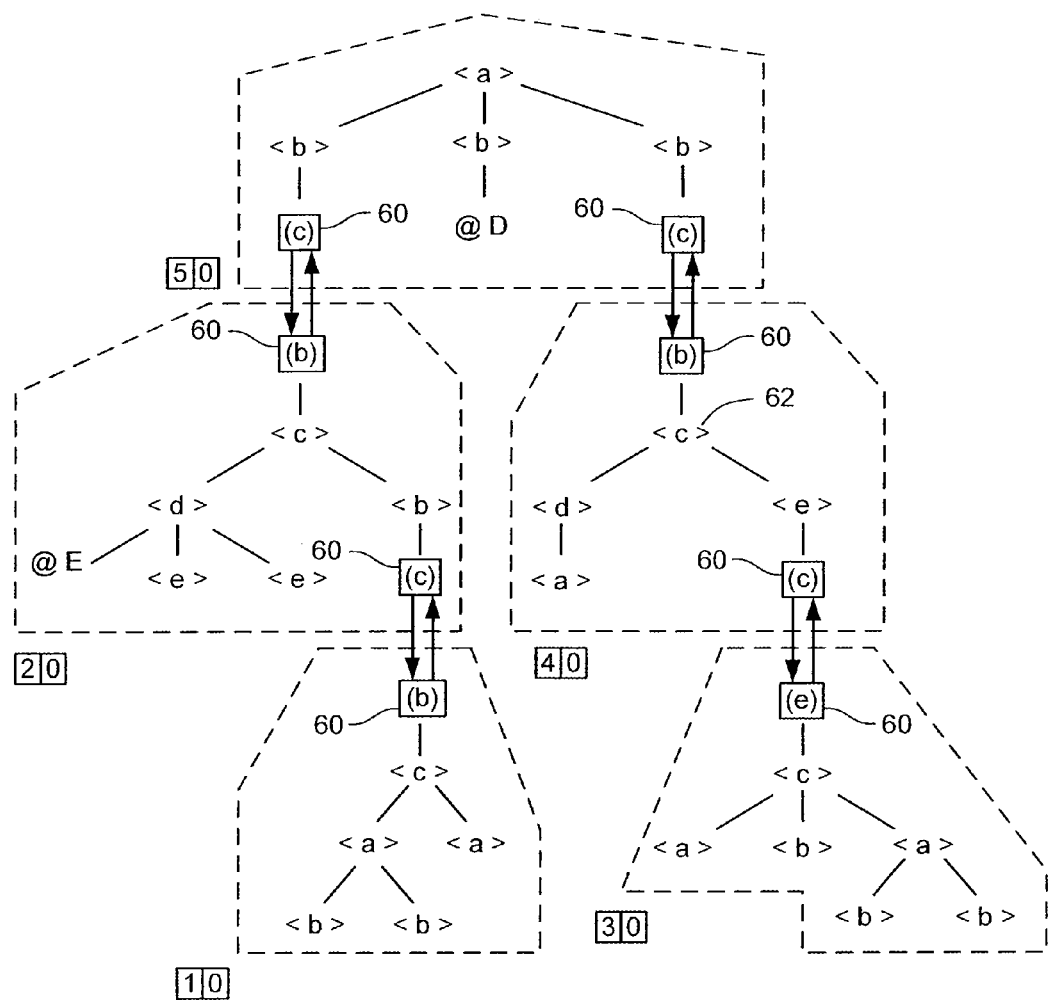
FIG. 8 illustrates the decomposition of FIG. 7 with the addition of link nodes.

FIG. 8 illustrates one approach to having nonoverlapping subtrees, namely by introducing the construct of link nodes 60. For each common node, an upper link node is added to the upper subtree and a lower link node is added to the lower subtree. These link nodes are shown in the figures by squares. The upper link node contains a pointer to the lower link node, which in turn contains a pointer to the root node of the lower overlapping subtree (which was the common node), while the lower link node contains a pointer to the upper link node, which in turn contains a pointer to the parent node of what was the common node. Each link node might also hold a copy of the other link node's label possibly along with other information. Thus, the upper link node may hold a copy of the lower subtree's root node label and the lower link node may hold a copy of the upper subtree's node label for the parent of what was the common node.

An XQuery may include an XPath location that indicates a path expression of elements. XPath location path expressions have the form "name_a/name_b/ . . . /name_z", and specify a pattern of elements within the XML document hierarchical element structure. The terms name_a, name_b, . . . refer to elements or attributes of the XML document. The XPath location path expression is used to specify a desired element that is to be retrieved. For example, if all authors' last names appearing within a "citation" fragment are desired, an XPath location path pattern is A/C/E or citation/author/last. For discussion purposes, the queries processed will be XQuery and XPath queries for XML documents; however, it will be understood that a person skilled in the art will appreciate other queries that may be processed for other documents. Thus, embodiments of the present invention are not limited to XML documents and XQueries.

Figure 9:
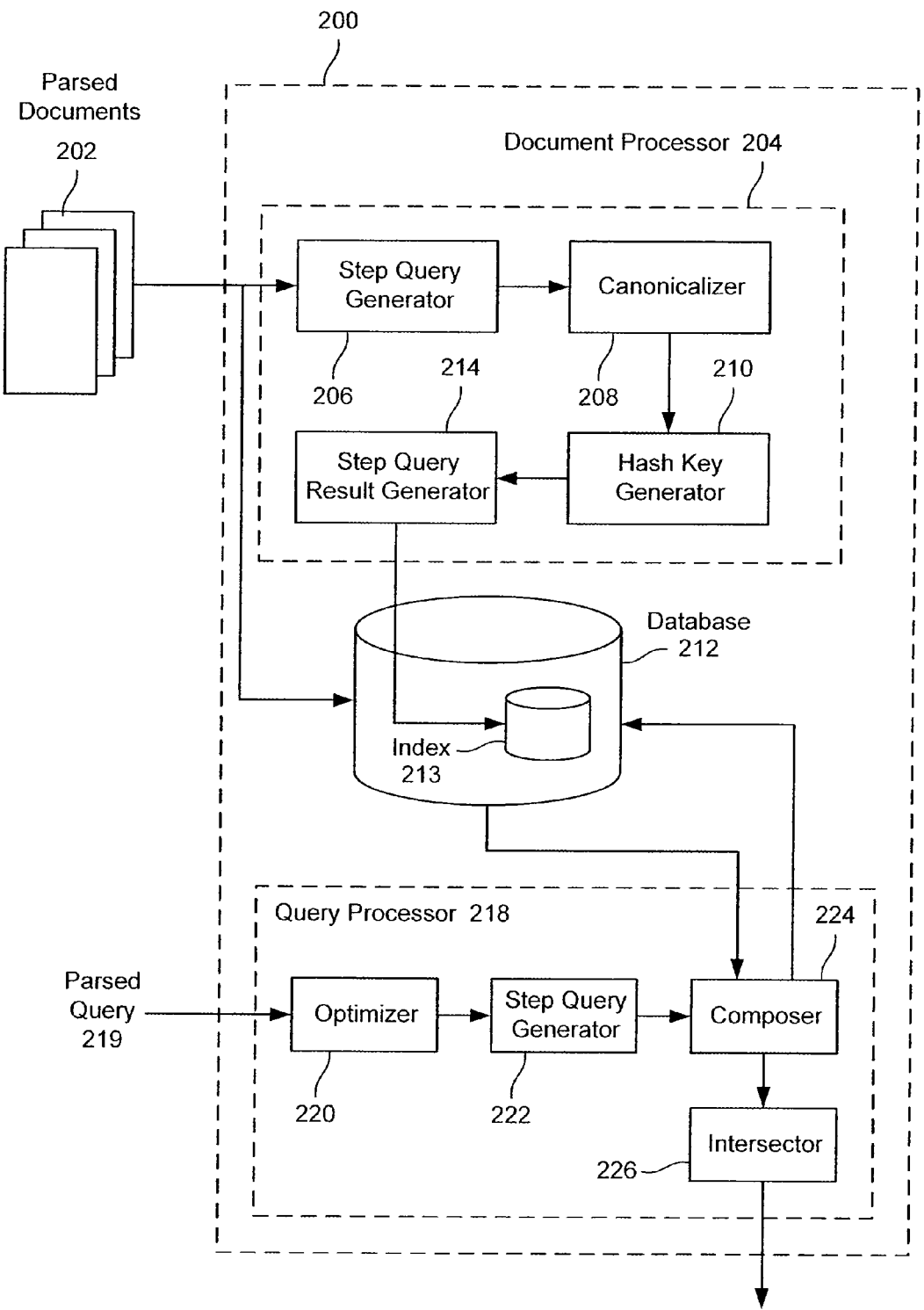
FIG. 9 illustrates an XQuery server (XQE) according to one embodiment.

FIG. 9 illustrates an XQuery server (XQE) 200 according to one embodiment. XQE 200 includes a document processor 204 and a query processor 218. Document processor 204 generates step queries and step query results from documents 202 and stores the step queries and step query results in a database 212. In one embodiment, documents 202 are parsed documents. For example, parsed documents are created by an XML parsing process. The parsing process accepts XML textual inputs (serialized XML), analyzes the element structure of these documents, and outputs a data structure that represents the input document as a linked collection of element nodes linked to attribute nodes and child element nodes. The parsed XML document also may contain text nodes, processing instruction nodes, and comment nodes.

Overview

Query processor 218 receives a query 219 for elements in documents 202 and generates step queries from a query 219. In one embodiment, query 219 is a parsed query. Parsed queries are created by an XQuery parsing process. The XQuery parsing process accepts XQuery textual inputs, analyzes their grammatical structure, and outputs a data structure that represents the Xquery query as a linked collection of expression nodes. For example, each query expression of the form 'A op B' is represented as an op-node with two children nodes representing the subexpressions A and B. The results from the step queries are retrieved from database 212 and a result for query 219 is determined. For example, an intersection of the results is taken to generate the result for query 219.

Document Processing

XQE 200 receives documents 202, such as the XML document of FIG. 1. Documents 202 are passed to a document processor 204, which includes a step query generator 206, a canonicalizer 208, a hash key generator 210, and a step query result generator 214. After receiving documents 202, step query generator 206 generates step queries from documents 202. The step queries are patterns from the hierarchical structure of elements in documents 202. For example, the step queries are relationships between elements that may be part of possible queries for elements in document 202. The number of steps, K, in a query represents a number of levels of relationships between elements. A query may be for any number of K steps. A larger K means faster execution but more space is required to store the larger step queries. A smaller K means slower execution but less space is required. For example, a two-step query may be a query for a parent node and its child node and a three-step query may be a query for a parent, its child, and the child's child. In one embodiment, one-step, two-step, three-step, and four-step queries may be generated from elements in documents 202. These step queries may take the form of these patterns for:

one-step queries:
(a) elem,
(b) word::wrd;

two-step queries:
(c) elem/word::wrd,
(d) elem/word::[string],
(e) elem/child,
(f) elem/@attr;

three-step queries:
(g) eleml@attr/word::wrd,
(h) elem/@attr/word::[string],
(i) elem/child/word::wrd,
(j) elem/child/word::[string],
(k) parent/elem/child;

and four-step queries:
(l) elem/child/@attr/word::wrd,
(m) elem/child/@attr/word::[string],
(n) parent/elem/child/word::wrd,
(o) parent/elem/child/word::[string],
(p) grandp/parent/elem/child.

It will be understood that step queries are not limited to the above queries and other step queries may be used and derived from documents 202.

Once the step queries are generated from documents 202, the step queries are passed to canonicalizer 208. Canonicalizer 208 reduces each step query to its canonical form. For example, the one-step queries are reduced to the following canonical forms:

| | |
|---|---|
| (a) elem | -> elem, |
| (b) word::wrd | -> wrd; | the two-step queries to the following canonical forms:

| | |
|---|---|
| (c) elem/word::wrd | -> elem#word("wrd"), |
| (d) elem/word::[string] | -> elem#string, |
| (e) elem/child | -> elem#child, |
| (f) elem/@attr | -> elem#/@#attr; | the three-step queries to the following canonical forms:

| | |
|---|---|
| (g) elem/@attr/word::wrd | -> elem#/@#attr#word("wrd"), |
| (h) elem/@attr/word::[string] | -> elem#/@#attr#string, |
| (i) elem/child/word::wrd | -> elem#/#child#word("wrd"), |
| (j) elem/child/word::[string] | -> elem#/#child#string, |
| (k) parent/elem/child | -> parent#/#elem#/#child; | and the four-step queries to the following canonical forms:

| |
|---|
| (l) elem/child/@attr/word::wrd -> elem#/#child/@#attr#word("wrd"), |
| (m) elem/child/@attr/word::[string] -> elem#/#child/@#attr#string, |
| (n) parent/elem/child/word::wrd -> parent#/#elem#/#child#word("wrd"), |
| (o) parent/elem/child/word::[string] -> parent#/#elem#/#child#string, |
| (p) grandp/parent/elem/child -> grandp#/parent#/#elem#/#child; |

Once the step queries are reduced to their canonical fonm, the step queries are passed to hash key generator 210.

Hash key generator 210 generates hash keys for each canonical fonm that may be used for indexing results for each step query. Although hash keys are described, it should be understood that any reference to a storage location may be used. In one embodiment, a 64-bit hash value is computed for each canonical form. Individual names such as parent, element, and child, as well as the literals word (" "), /@, and/ generate hash values by direct application of a 64-bit hashing function in hash key generator 210. Also, terms (tokens) separated by the hash mark "#" may be composed by applying either the formula A#B=hash64(A)*5 +hash64(B), or the formula A#B=hash64(hash64(A), B), where hash64 represents the hashing function. The latter formula expresses a general compositional mechanism for forming the hash key for two tokens using previously computed hash values for the first token. Hash key generator 210 uses hash value caches and hash composition to compute hash keys for all the indexable step queries.

For example, the hash key for elem#/@attr is computed by the hashing function as:

hash64(elem)*5+(hash64(/@)+hash64(attr));

and the hash key for A#B#C is computed as:

hash64(hash64(hash64(A), B), C)

and the hash key for A#B#C# . . . #Y#Z is computed as hash64(hash64( . . . (hash64(hash64(A), B), C), . . . , Y), Z).

Additionally, the hash key for a string value, such as: string=word_1 word_2 . . . word_n, is computed by composition across the word tokens within the string. Thus, the hash key is computed as follows:

( . . . (hash64(word_1)*5+hash64(word_2)*5+. . . )*5+hash64(word_n)).

The hash keys generated from hash key generator 210 are stored in an index 213 of database 212. Also, the hash keys for each canonical step query are used to access step query results stored in index 213 of database 212. The step query results are generated by step query result generator 214. Step query result generator 214 receives the step queries generated from step query generator 206 and generates the results for each step query using the hierarchical structure of documents 202 corresponding to the step query. In one embodiment, the step query results may be the element(s) corresponding to the step query. In another embodiment, the step query results for a step query are one or more sub-tree IDs corresponding to the XML fragment for the step query. The step query and corresponding step query results may be stored as a PostingList, which will be described below. Additionally, a frequency count of how many times the step query result occurs within the XML fragment is connected with the step query result. Once the results for the step queries are determined, step query result generator 214 stores the results in index 213. In one embodiment, index 213 includes, but is not limited to, the results of all atomic one-step queries of the forms:

(a) find all elements with a given name,
(b) find all elements containing a given word;

in addition, it includes the results of all two-step queries of the forms:

(c) find all elements of a given name whose text content contains a given word,
(d) find all elements of a given name whose text content equals a given string,
(e) find all elements of a given name with a child element of a given name,
(f) find all elements of a given name with an attribute of a given name;

in addition, it includes the results of all three-step queries of the forms:

(g) find all elements of a given name with an attribute of a given name whose value contains a given word,
(h) find all elements of a given name with an attribute of a given name whose value equals a given string,
(i) find all elements of a given name with a child element of a given name whose text content contains a given word,
(j) find all elements of a given name with a child element of a given name whose text content equals a given string,
(k) find all elements of a given name with a parent of a given name and a child element of a given name;

and in addition, it includes the results of all three-step queries of the forms:

(l) find all elements of a given name with a child element of a given name with an attribute of a given name whose value contains a given word,
(m) find all elements of a given name with a child element of given name with an attribute of a given name whose value equals a given string,
(n) find all elements of a given name with a parent element of a given name with a child element of a given name whose text content contains a given word,
(o) find all elements of a given name with a parent element of a given name with an element of a given name with a child element of a given name whose text content equals a given string,
(p) find all elements of a given name with a grandparent element of a given name with a parent element of a given name with an element of a given name and a child element of a given name;

It will be understood that the step query results are not limited to the above possibilities and may store atomic query results up to any fixed finite level.

In one embodiment, index 213 is an inverted file index. The inverted file index maps terms to PostingLists. The terms correspond to textual units extracted from a collection of documents 202 or document fragments from documents 202, and PostingLists describe where and how often each term appeared within a given document or document fragment from documents 202. In one embodiment, 'terms' are the atomic text units of document 202. Terms are generated by 'tokenizing' the text content of the document. Text is tokenized through a process of table lookup for each character to determine if that character is a word constituent, white space, or punctuation. Word constituent characters delimited by either spaces or punctuation are accumulated as 'tokens'. Canonicalized step queries are also terms.

In one embodiment, a hash key is stored in a memory-map list index file in index 213 whose entries contain (key, offset) pairs, where the offset describes the absolute location within a Listdata file where the list of results for the step query may be found. Thus, the Listdata file includes a reference to the step query results. In one embodiment, the step query results are stored as a compressed list of (subtree-id, frequency-count) pairs. A subtree-id uniquely identifies the XML fragment matching the atomic step query, and the frequency-count describes the approximate number of times that the match occurred within document 202 or the document fragment of document 202.

In one embodiment, a list of results in the ListData file may be referred to as the PostingList. The PostingList includes the unique subtree-id identifier of the corresponding result of the step query. Additionally, the PostingList includes a score, which is a normalized frequency count. For example, index 213 stores, for each term, at a location determined by the hash key of that term, a PostingList containing references to the subtrees containing the term along with a normalized frequency count (score) that approximates the number of occurrences of the term within the subtree. In one embodiment, the sequence of nodes returned by the function search may be ordered by a 'relevance' score. The relevance of a node to the specified query is a complex function that depends on the frequency the query terms appear in the text of the query nodes, the frequency the query terms appear across the entire database, and the quality score attached to a given node. The quality score is further described in Linblad IV-A. In one embodiment, the PostingLists are stored in a compressed format. Although the PostingList is described, it will be understood that other lists may be used to store step query results.

Each hash value provides an index into a memory-mapped ListIndex file of fixed-length records. Each record contains a pair including a hash key and a fixed-width file offset. The file offset describes the location within a secondary ListData heap file where the PostingLists are stored. Binary search finds the (key, offset) pair within the Listindex file, then a single random access I/O to the ListData file locates the first block of PostingList data. In most cases one data block contains the entire PostingList. But if not, and the PostingList exceeds the size of one data block, then subsequent sequential I/O's fetch the remainder of the list. The number of I/O is proportional the length of the PostingList divided by the packing factor—that is, the number of individual postings per block.

In one embodiment, the format uses unary-log-log variable length bit encodings for subtree id's and scores. Furthermore, both subtree id's and scores may be kept in a differential form where each Posting stores only the encoded difference from the preceding subtree id and score. Large PostingLists typically have long strings of consecutive subtree id's with scores that are mostly equal. The PostingList formats encode the consecutive runs using only one or two bits for the delta(id) (the id differential), and delta (score) (the score differential). Large PostingLists are stored with markers containing sufficient information to allow a search process to skip forward across blocks of Postings (a "skip-list" structure). The skip-list block size a configurable parameter.

For any choice of the skip-list block size parameter, three cases may arise: (1) the PostingList size is less than fifteen, (2) the PostingList size is less than or equal to one block, and (3) the PostingList size exceeds a single block. In the following description, the square brackets [ ] indicate 'unary-log-log variable length bit encoding'. The parentheses indicate bit fields of a specified size, (e.g., length(0:3) means a 4-bit field). The notations {0} and {1} indicate constant bits equal to 0 and 1, respectively.

In case (1) the length, being less than 15, occupies four leading bits, and the rest of the format is packed with variable-length bit encodings of differential subtree id's and scores:
    length(0:3), [id0], [score0],
        [id1-id0], [score1-score0],
        [id2-id1], [score2-score1],
        [id3-id2], [score3-score2], In case (2), the four leading bits are all set to 0, and the format is:
    {0}(0:3), [length],
        [id0], [score0],
        [id1-id0], [score1-score0],
        [id2-id1], [score2-score1],
        [id3-id2], [score3-score2], And in case (3), the four leading bits are all set to 1 and the format is: {1}(0:3), [length], Block0, Block1, Block2, ...

Each Block has the format:
    maxSubtreeID[0:32], numPostings[0:15], numWords[0:15],
        [id0], [score0],
        [id1-id0], [score1-score0],
        [id2-id1], [score2-score1],
        [id3-id2], [score3-score2], ...

MaxSubreeID bounds the ordinal size of any subtree id appearing in the block; numPostings bounds the number of Postings in the block and numWords is the size of the block in 32-bit words.

A search for a given subtree id proceeds by scanning down the list: if maxSubreeID is smaller than the given id, then the process skips forward to the start of the next block by incrementing the list offset by numWords.

The granularity of index 213 will now be described. More details relating to index 213 and storage of subtree IDs are disclosed in Linblad I-A. Index 213 stores the SubTree ids. The result of searching database 212 with step queries is a list of SubTrees satisfying the step queries. The system synthesizes per-element search query results by loading whole SubTrees into memory of XQE 200 and then seeking within the SubTree for specific elements, attributes, text content, or any of the combinations of elements, attributes and content described above. The SubTree represents a unit of locality. The indexes are designed to speed up queries that can be resolved by locating a contiguous fragment of the original XML document and then navigating within that fragment.

In one example, referring to FIGS. 1 and 2, document processor 204 may receive the document fragment of FIG. 1 and generate step queries of the form:

one step queries:
    A,B,C,D,E,F; and
    term_1, term_2, term_3, . . . for each term appearing in A, B, C, . . . ;

two-step queries:
    A/B, A/C, A/D, C/E, and C/F, and
    A/word(term_1), A/word(term_2), A/word(term_3), . . . , three-step queries:
    A/C/E, and A/C/F.

Each of the above step queries may be assigned a hash value and stored in index 213. The results of the step queries are then computed and stored in step query database 216. The hash value may then be used to look up the step query results, which point to one or more sub-tree IDs for the XML fragment corresponding to the step query. For example, the step query A/B includes the sub-tree ID for the citation/title fragment.

Query Processing

One embodiment of query processor 218, which includes an optimizer 220, a step query generator 222, a composer 224, and an intersector 226, will now be described. Query processor 218 receives query 219, generates step queries from query 219, uses the generated step queries to retrieve the pre-computed step query results in database 212, and uses the step queries to output a query result. Thus, when a query is received for documents 202, the results for step queries generated from the query are already known.

After receiving query 219, query processor 218 sends query 219 to optimizer 220, which may optimize the query if necessary. The optimization process will be described in more detail below. The optimized query is then sent to a step query generator 222.

Step query generator 222 generates step queries from query 219. As described above, with reference to step query generator 206, step query generator 222 breaks query 219 into step queries, such as one-step queries, two-step queries, three-step queries, and four-step queries. For example, step query generator 222 reduces or decomposes query 219 of a form:

aa_1/aa_2/aa_3/aa_4/ . . . /aa_(n-1)/aa_n (where the ellipses indicate that any finite number of additional steps may appear in the query)

to a sequence of two-step queries as follows:

aa_1/aa_2, aa_2/aa_3, aa_3/aa_4, . . . , aa_(n-2)/
        aa_(n-1), aa_(n-1)/aa_n.

Queries containing trailing attribute specifications, as in aa_1/aa_2/aa_3/aa_4/ . . . /@aa_n, are reduced to a sequence of two-step queries as follows:

aa_1/aa_2, aa_2/aa_3, aa_3/aa_4, . . . , aa_(n-2)/
        aa_(n-1), aa_(n-1)/@aa_n.

Queries containing trailing word specifications, as in aa_1/aa_2/aa_3/ . . . /aa_n/word::wrd, are reduced to a sequence of two-step queries as follows:

aa_1/aa_2, aa_2/aa_3, . . . , aa_(n-1)/aa_n, aa_n/
        word::wrd.

Queries containing trailing attribute word specifications, as in aa_1/aa_2/aa_3/ . . . /aa_(n-1)/@aa_n/word::wrd, are reduced to a sequence of two-step and three-step queries as follows:

aa_1/aa_2, aa_2aa_3, . . . , aa_(n-2)/aa_(n-1),
        aa_(n-1)/@aa_n/word::wrd.

The generated step queries are passed to composer 224, which accesses database 212 to retrieve the results for the step queries. In one embodiment, composer 224 may reduce the step queries to their canonical form and generate a hash key for the step query with methods as described above. Composer 224 references the hash key values in index 213 to retrieve the results from index 213. In one embodiment, the results may be one or more sub-tree IDs for the elements. In another embodiment, the results may be the elements corresponding to the step queries or all of the elements in each subtree.

Intersector 226 determines a result for the query using the step query results. The result is one or more subtrees that include all of the step queries. In one embodiment, one or more subtree IDs are returned. In one example, intersector 226 takes the intersection of the results of the step queries to produce a result that includes a result for query 219. An intersection of the results of the step queries may include some additional unwanted results. A post-processing step may be performed by intersector 226 in which the unwanted results are eliminated. For example, the post-processing step matches each step query element of the intersection against the original query. After post-processing, the query result is outputted.

The optimization process implemented by optimizer 220 will now be described. Optimizer 220 may optimize query 119 by rewriting query 119 in a form that may be used by step query generator 222 to generate optimized step queries. For example, optimizer 220 includes rewriting rules where queries 119 are rewritten in terms of the pre-computed step queries.

For example, optimizer 220 may rewrite path expressions of the form aa_1//aa_2 by consulting a tree structure that represents the set of relations among the elements described for document 202 for which the query is intended. The '//' operator specifies the set of all nodes appearing below a given element node in the document tree. For example, 'A//B' specifies the set of all the element nodes labeled 'B' which are strict descendants of 'A'. In one embodiment, optimizer 220 references elements described in XML schema where the schema includes, for each element that may occur in the document, a name, the type, the set of attributes, and the set of allowable constituent elements. The relations are represented in a graph, such as the one shown in FIG. 1, with one vertex for each element name, and one edge from an element to each possible constituent.

Given an XPath location path expression of the form aa_1// aa_2, optimizer 220 attempts to determine a set of all possible sequences that interpolate the "//" (descendent-or-self::) step. The 'descendant-or-self::' operator specifies the set of all nodes at or below a given node in the document tree. For example, 'A/descendant-or-self::B' specifies the set of all descendants, including 'A', of the element node 'A'. For example, referring to FIG. 2, the expression A//E may be written as (A/B/E union A/C/E). In some cases, the XPath location expression A//E may have an unlimited number of legal expansions. In this case, optimizer 220 does not attempt to rewrite the expression.

The optimized query is then passed to step query generator 222 for processing into step queries. The results to the step queries are retrieved as described above and the intersection taken by intersector 226. In post-processing, contiguous portions (maximal sequences of "/" separated steps) are processed as described above. Then, the results for the contiguous portions are then post-processed to verify the descendent relation by following parent links for the residual "//" steps. For example, the location path expression A/C//B/E will be optimized as the pair of index queries A/C, B/E and for each node returned by the B/E parent links followed, parent links are followed to verify that some ancestor appears in the node set returned by A/C. The post-processing is done by creating an auxiliary hash index for the node ids occurring in A/C.

The post-processing step takes a sequence of subtree ids returned by the query composer and intersector, and scans these subtrees for the purpose of resolving general XPath location path expressions. A general XPath location path has the following syntax:

$$A[p\_11] \ldots [p\_1a]/B[p\_21] \ldots [p\_2b]/$$
$$C[p\_31] \ldots [p\_3c]/ \ldots /T[p\_k1] \ldots [p\_kt]$$

or $$A[p\_11] \ldots [p\_1a]/B[p\_21] \ldots [p\_2b]/$$
$$C[p\_31] \ldots [p\_3c]/ \ldots /@T[p\_k1] \ldots [p\_kt]$$

Each of A, B, C, ..., T is an element label, and the last step T may be either an element label, an attribute label, or a non-element node type selector, e.g., 'text( )' for text nodes, 'comment( )' for comment nodes, and 'pi( )' for processing instruction nodes. Each p_ij is a predicate expression that may involve as inputs additional (nested) XPath expressions, or in the case of XQuery, variables from an enclosing scope. The post-processing step starts with a set of nodes corresponding to the last step. These are extracted from the subtrees appearing in the intersection of the pair step query results. This is called the 'candidate set'. For each node in the candidate set, the post-processing step moves backwards through the location path expression—that is, the chain of ancestor nodes is obtained. (This may entail additional access to the database subtree store.) For each ancestor chain, the location path expression is tested in its entirety, to verify that the element node labels correspond, and then that each sequence of step predicates p_k1, ..., p_kj evaluates to 'true'. The post-processing algorithm is a 'generate-and-test' algorithm: for each element in the candidate set, a full path is generated by following parent links, and then this path is tested against the given location path expression in its entirety. The post-processing generator does not evaluate predicates for candidates whose ancestor chain fails to match the node label pattern, (e.g.) A/B/C/ . . . /T. For example, the location path query $$A[p(\,)]/B[q(\,)]/C[r(\,)]/@D$$

will be resolved as:

1. Composer 224 takes step queries and forms the set of index search queries:
   Q1 : element-child-descendant-query("A", "B")
   Q2 : element-child-descendant-query("B", "C")
   Q3 : element-attribute-query("C", "D")

The first step query Q1 corresponds to the canonicalized term A#/#B, the second step query Q2 corresponds to the canonicalized term B#/#C, and the third step query Q3 corresponds to the canonicalized term C#/#D. Q1 and Q2 are 'descendant-queries', which means that the queries specify a search among the descendants of nodes matching the given pattern. In this example, the first step query 'xqe:element-child-descendant-query("A", "B")' specifies a search among the descendants of B within subtrees containing the node pattern 'A/B'.

2. Intersector 226 receives a search of:
   search(and-query(Q1, Q2, Q3), "C").

A search is performed for the intersection of Q1, Q2, and Q3, which returns a sequence of nodes labeled C. The PostingLists for the canonicalized terms corresponding to Q1, Q2, and Q3 are retrieved from index 213, and then scanned for common subtree ids. The PostingList skip list structure is used to prune the search for common subtree ids. A PostingList block will be skipped over in the event that the 'maxSubTreeID' stored in the block is actually smaller than any of the currently smallest remaining subtree id in the other PostingLists.

3. Post-processing:
   For each node c labeled C, generate the ancestor path going back two steps, and check if grandparent(c)=A, parent(c)=B. If not, discard c, and loop around to processes the next node. If yes, then test the entire XPath expression $$A[p\_11] \ldots [p\_1a]/B[p\_21] \ldots [p\_2a]/$$
$$C[p\_31] \ldots [p\_3a]/@D$$

by evaluating the predicate expressions from leftmost (highest) to rightmost (lowest) step, as specified in the XPath standard. In this example, the step tests include a test for an attribute node labeled 'D' following 'C'.

Figure 10:
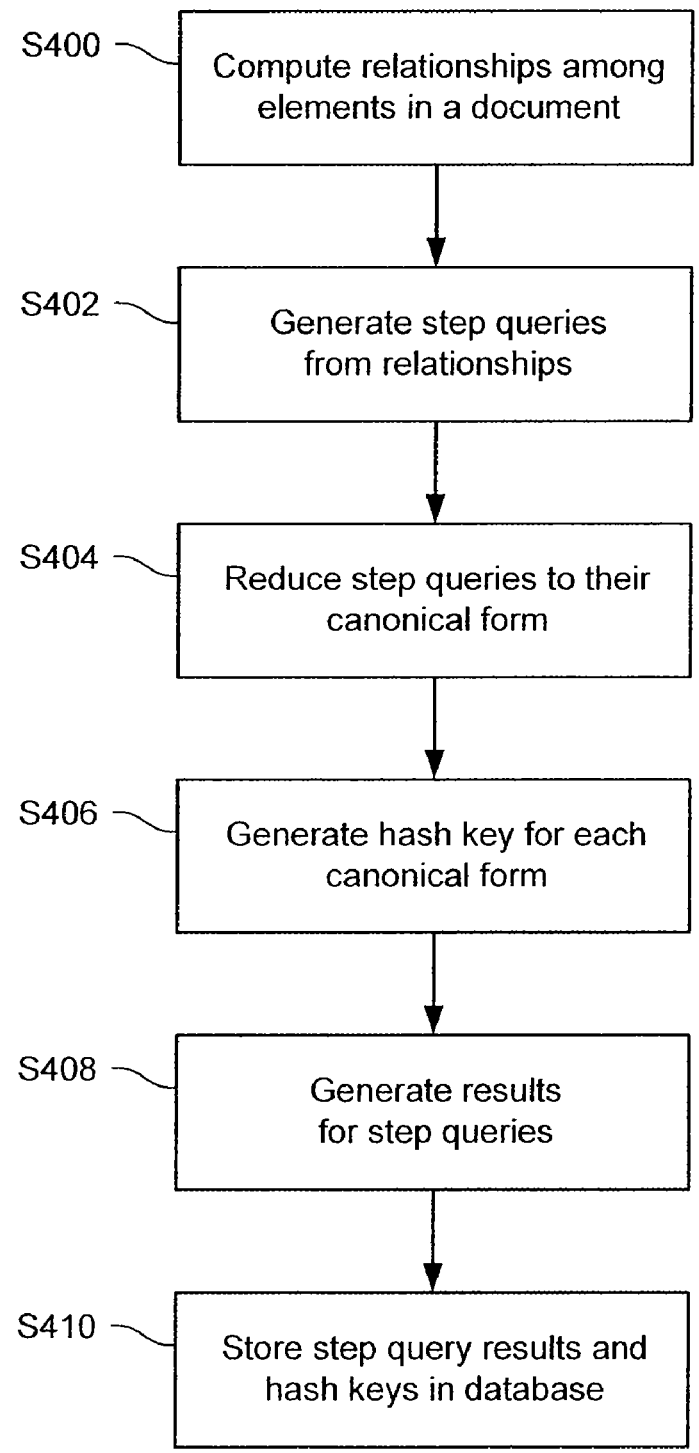
FIG. 10 illustrates a flow chart for a process for generating database according to one embodiment.

FIG. 10 illustrates a flow chart for a process for generating database 212 according to one embodiment. In step S400, relationships among elements in a document are computed. In step S402, step queries are generated from the relationships between the elements. For example, one-step, two-step, three-step, and four-step queries are generated from the relationship of elements.

In step S404, the step queries are reduced to their canonical form. In step S406, the process generates a hash key for each canonical form of the step queries. Additionally, in step S408, results for the step queries are generated from the relationship of elements. In one embodiment, the results represent one or more subtree IDs for the elements relating to each step query.

In step S410, the step query results and the corresponding hash keys are stored in database 212.

Figure 11:
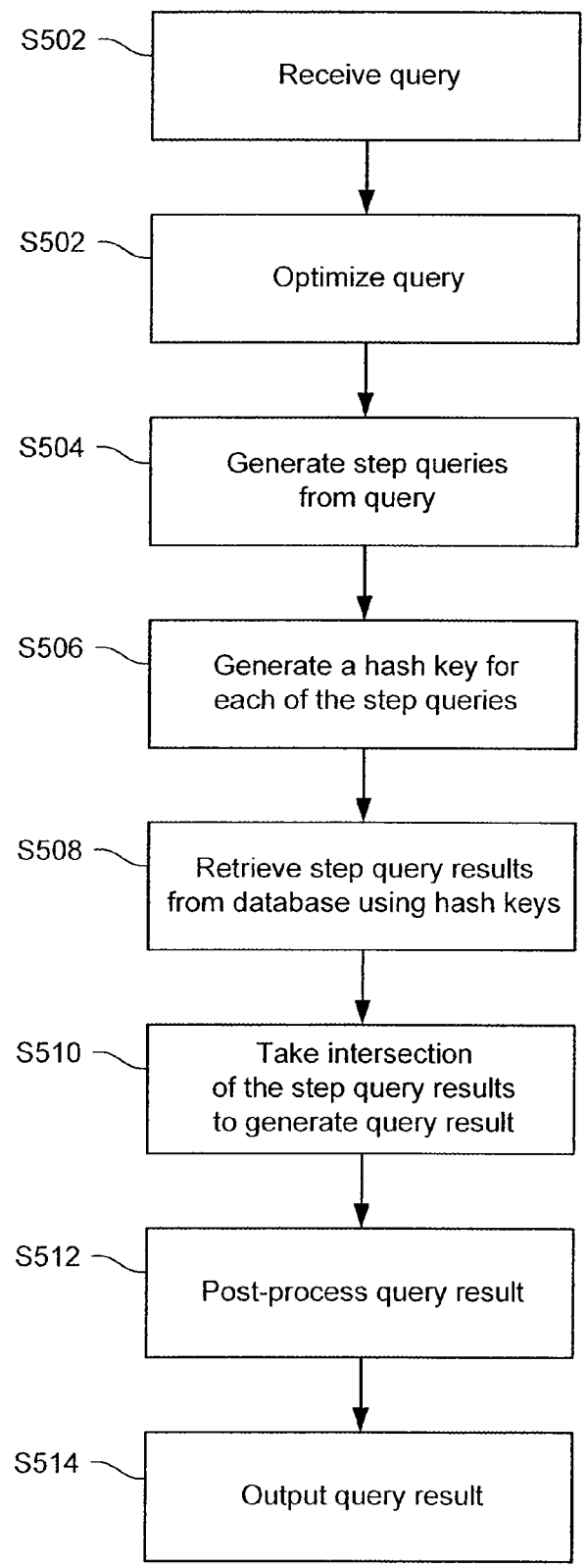
FIG. 11 is a flow chart of a process for generating a result for query according to one embodiment.

FIG. 11 is a flow chart of a process for generating a result for query 119 according to one embodiment. In step S500, query 119 is received by XQE 200 at query processor 218. In step S502, a query may be optimized. In step S204, the optimized query is then reduced into step queries.

In step S506, a hash key is generated for each of the step queries. In step S508, database 212 is accessed and step query results are retrieved using the calculated hash key. For example, a PostingList may be retrieved.

In step S510, the intersection of the step query results is taken and a query result is generated from the intersection. For example, results from the PostingList are subtree IDs. The method determines matching subtree IDs where the matching subtree IDs would include the step queries associated with the step query results.

In S512, the query result may be post-processed. In step S514, the query result is outputted.

Figure 12:
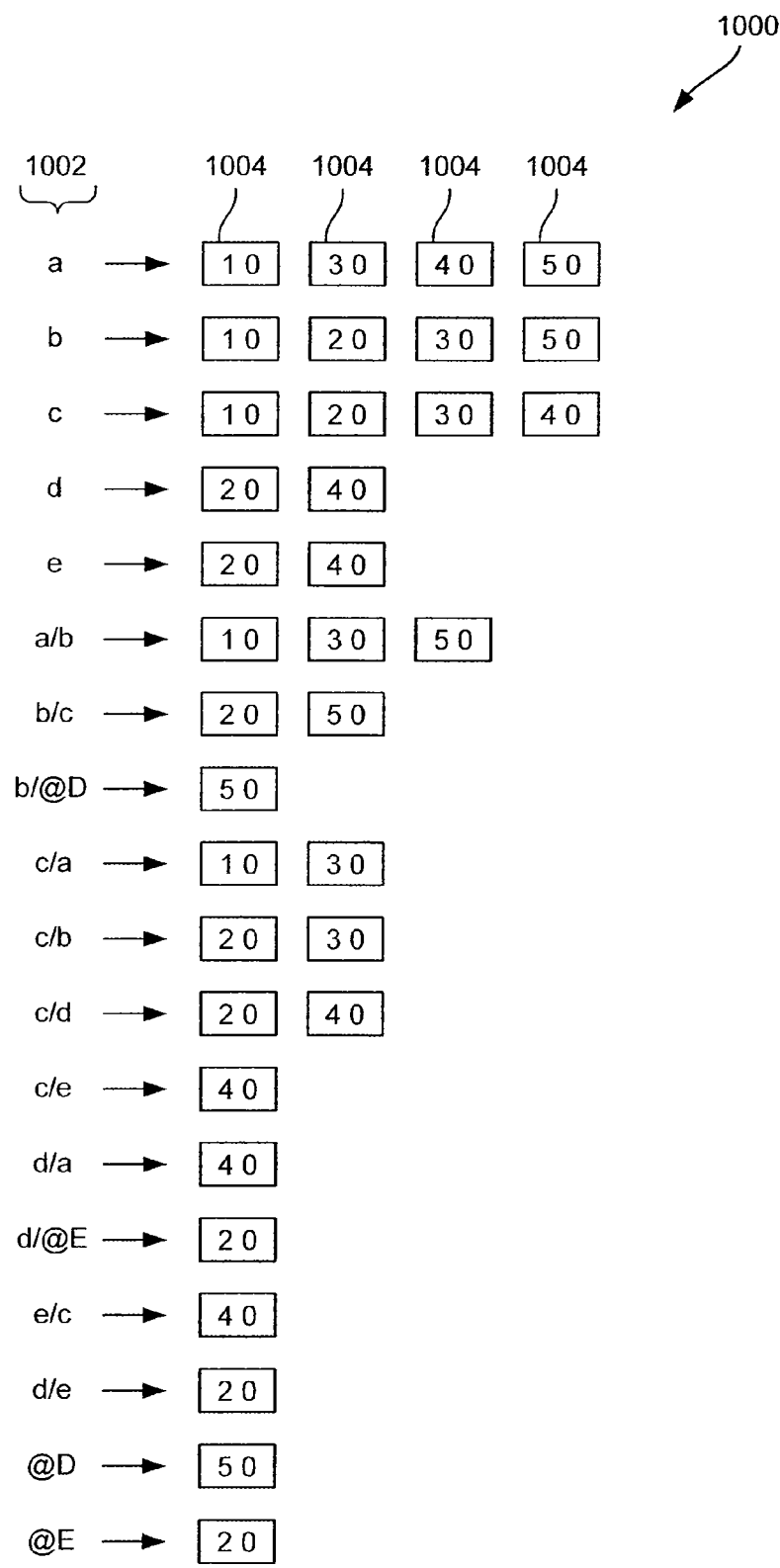
FIG. 12 depicts a PostingList that may be stored using the structure shown in FIG. 10 according to one embodiment of the present invention.

An example using an embodiment of the present invention will now be described. FIG. 12 depicts a PostingList 1000 that may be stored for the structure shown in FIG. 8 according to one embodiment of the present invention. A plurality of step queries 1002 are shown. Each step query represents a combination of nodes shown in FIG. 8 and one or more subtree IDs 1004 are associated with each step query 1002. For example, the step query "c/a" is found in the subtrees "10" and "30".

For discussion purposes, the relationships that cross subtrees are shown without any link nodes, for example, <e>→link node(c)→link node(e)→<c> is represented as <e>→<c>. Also, the upper node in the relationship is used to determine the subtree ID that is associated with step query. For example, the step query <e>→link node(c)→link node (e) →<c> is associated with subtree "40".

Figure 13:
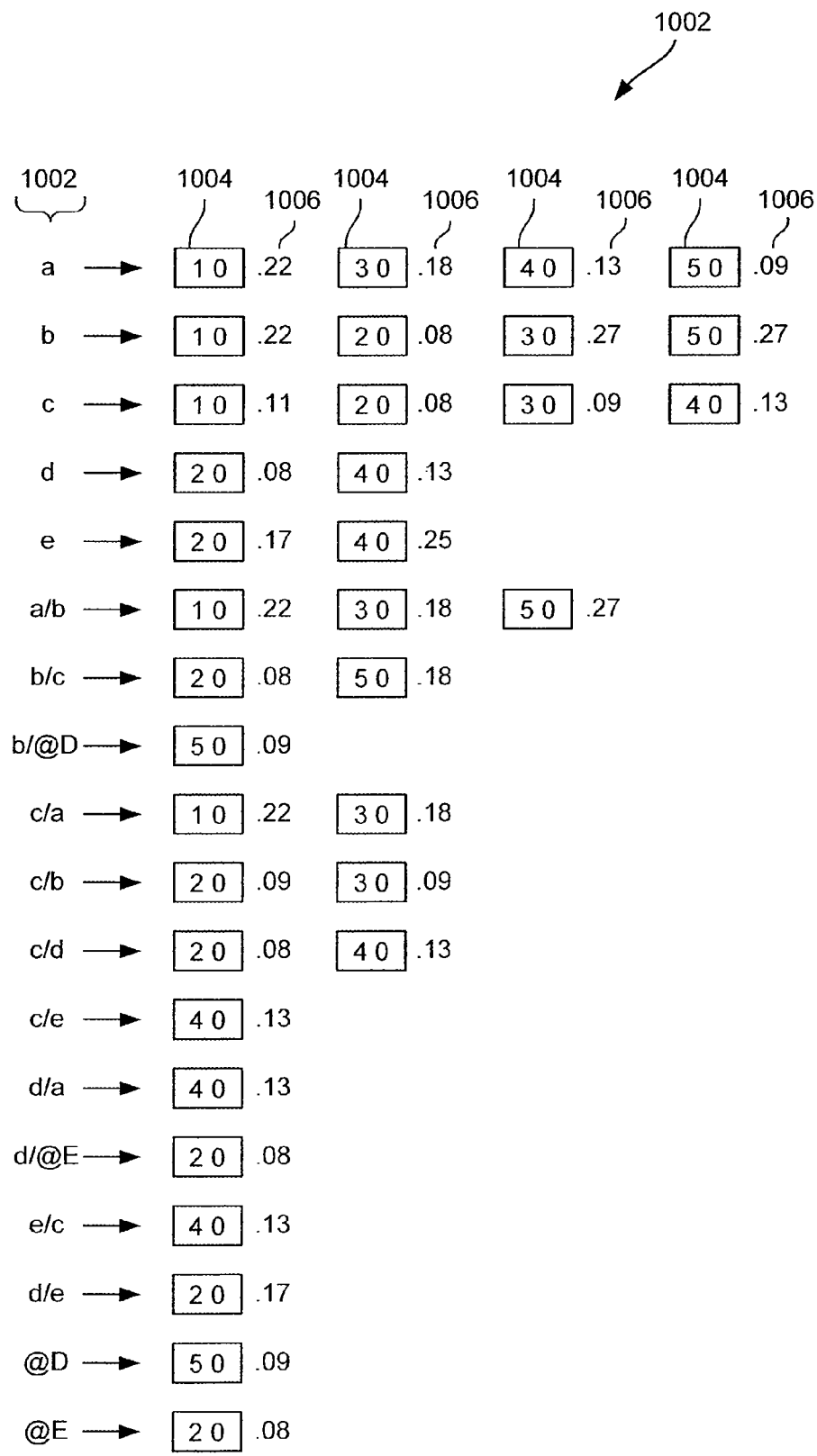
FIG. 13 depicts a PostingList with corresponding scores for each subtree ID according to one embodiment of the present invention.

FIG. 13 depicts PostingList 1000 with corresponding scores for each subtree ID according to one embodiment of the present invention. As shown, each step query 1002 and subtree ID 1004 pair has a score 1006 associated with it. Each score 1006 represents a numeric score that measures the relevance of step query 1002 to the step query in which it appears. In one embodiment, the score is computed by a function proportional to the number of occurrences of the term in the subtree divided by the total number of terms of any kind appearing in the subtree and may be normalized.

FIGS. 14A-14E depict PostingList structures for each subtree according to one embodiment of the present invention. FIG. 14A shows step queries 1100 that represent each step query found in the subtree represented by subtree ID "10". A frequency 1102 is shown for each step query 1100. A score 1104 is also shown for each step query 1100. For example, the step query "c/a" occurs twice in subtree 10 and has a score of .22.

FIG. 14B shows step queries 1100 that represent each step query found in the subtree represented by subtree ID "20". FIG. 14C shows step queries 1100 that represent each step query found in the subtree represented by subtree ID "30". FIG. 14D shows step queries 1100 that represent each step query found in the subtree represented by subtree ID "40". FIG. 14E shows step queries 1100 that represent each step query found in the subtree represented by subtree ID "50".

Using the above PostingLists described in FIGS. 12-14, the following step query "b/c/a" may be queried. The query is broken down into the step queries of "b/c" and "c/a". Table I shows values that may be retrieved for PostingList 1000.

TABLE I

| Step Query | Subtree ID → Score | Subtree ID → Score |
|---|---|---|
| b/c | 20 → .08 | 50 → .18 |
| c/a | 10 → .22 | 30 → .18 |

The intersection of the subtree IDs for each step query is then taken. For example, the subtree IDs "20" and "50" are intersected with the subtree IDs "10" and "30". The intersection of these IDs is empty.

Although the intersection is empty, a further step may be taken to resolve the query. A query for step queries that may include link nodes (e.g., link node(c)) is then performed. Thus, step query results for the step query "<b>→link node (c)" may be retrieved. The results returned would be b/ link node (c)=subtree ID 20→(subtree ID 10); subtree ID 50→(subtree ID 20); and subtree ID 50→(subtree ID 40). The above means that a "b/c" step query is linked across the subtrees 20/10, 50/20, and 50/40.

Table II represents the new results including the linked step query results.

TABLE II

| Step Query | Subtree ID → Score | Subtree ID → Score | Subtree ID → Score |
|---|---|---|---|
| b/c | 20 → .08 | 50 → .18 | |
| c/a | 10 → .22 | 30 → .18 | |
| b/link node c | 20(10) | 50(20) | 50(40) |

The intersection of the three lists yields a set of candidate subtrees where the path b/c/a might occur, in this case, subtree ID 20→subtree ID 10. As shown in FIG. 8, the path b/c/a is found in subtrees 20 and 10. The subtrees are then retrieved and examined to verify the presence or absence of the path b/c/a. The path is then returned as the result of the query.

Although scores were not used in the above example, in one embodiment, scores may be used to determine the relevance of step query results. If many results are returned, the scores may be used to determine which step query results may be processed first. For example, if a subtree ID has a high score, then it may be more likely that the subtree corresponding to the ID includes the elements of the query. Additionally, the subtree may be more relevant for the query. The scores may thus be used to prioritize processing and also to provide a list that represents the relevance of subtrees for a query.

In another example, system 200 may process results to determine if any false positives are returned for the results. Using the query, "c/a/b", the following step queries are determined: "c/a" and "a/b". Table III depicts an example PostingList.

TABLE III

| Step Query | Subtree ID → Score | Subtree ID → Score | Subtree ID → Score |
|---|---|---|---|
| c/a | 10 → .22 | 30 → .18 | |
| a/b | 10 → .22 | 30 → .18 | 50 → .27 |

Figure 15A:
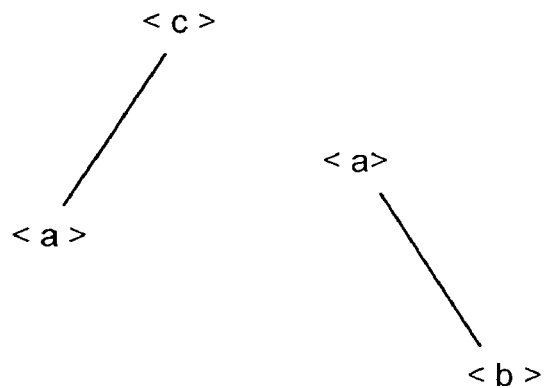
FIG. 15A shows a false positive match and FIG. 15B shows a positive match.
Figure 15B:
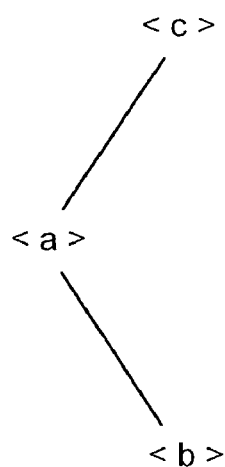

The intersection of the step query results for the two step queries yields the subtree IDs of "10" and "30". The subtree fragments corresponding to the subtree IDs are then retrieved. Each subtree fragment includes both step queries. However, the path in a fragment may not include the full query. For example, the "c/a" fragment should end with the "a/b" fragment. The subtree fragments are then traversed to determine if a fragment includes the query. FIG. 15A shows a false positive match and FIG. 15B shows a positive match. As shown in FIG. 15A, the "c/a" element does not connect directly to the "a/b" element. Thus, the fragment does not contain a "c/a/b" path. In FIG. 15B, a positive is shown as the path "c/a/b" is found in the fragment. This path may be returned as the result of the query.

In one embodiment, XQE 200 may be used to search for text in documents 202. A text search involves retrieving node sets (XML document fragments) that are relevant to a given set of terms. For example, a text search query may have the form: 'return all Citation nodes whose text content is relevant to the phrase "knee surgery".' Complex search query results may be reduced to the intersection of step query results in much the same way that location path queries may be reduced to the intersection of step queries followed by the generate-and-test post-processing step. A search for a set of terms { term_1, term_2, ..., term_n} or a phrase "term_1 term_2 ... term_k" within the set of nodes with a given element A can be directly resolved by doing an index lookup for the terms: A#word(term_1), A#word(term_2), ..., A#word (term_k), followed by an intersection of the results. For a phrase query, a post-processing step will verify that the terms appear contiguously in the subtrees.

XQE 200 indexes support full-text search across index 213. XQE 200 includes a set of built-in functions which resolve a variety of full-text queries, with methods:

(a) for constructing AND queries that specify a search within the intersection of any number of subsets specified by sub-queries, (b) for constructing OR queries that specify a search within the union of any number of subsets specified by sub-queries, (c) for constructing AND-NOT queries that specify a search within the set difference of two subsets specified by sub-queries, (d) for constructing WORD queries that specify a search within elements whose text nodes contain a given phrase, (e) for constructing ELEMENT queries that specify a search within the set of elements with a given QName, (f) for constructing ELEMENT-VALUE queries that specify a search within the set of elements with a given QName whose full text value exactly matches a given phrase, (g) for constructing ELEMENT-WORD queries that specify a search within the set of elements with a given QName whose text nodes contain a given phrase, (h) for constructing ELEMENT-ATTRIBUTE queries that specify a search within the set of elements with a given QName which contain an attribute with a given QName, (i) for constructing ELEMENT-ATTRIBUTE-VALUE queries that specify a search within the set of elements with a given QName which contain an attribute with a given QName, such that the attribute text exactly matches a given phrase, (j) for constructing ELEMENT-ATTRIBUTE-WORD queries that specify a search within the set of elements with a given QName which contain an attribute with a given QName, such that the attribute text contains a given phrase, (k) for constructing ELEMENT-CHILD queries that specify a search within the set of elements with a given QName that have a child with a given QName, (l) for constructing ELEMENT-DESCENDANT queries that specify a search within the set of descendants of an element with a given QName, (m) for constructing ROOT-ELEMENT-DESCENDANT queries that specify a search within the set of descendants of an element with a given QName whose parent is a document node with a given QName, (n) for constructing ELEMENT-CHILD-DESCENDANT queries that specify a search within the set of descendants of an element with a given QName whose parent has a given QName, (o) for constructing ELEMENT-ATTRIBUTE-DESCENDANT queries that specify a search within the set of descendants of an element with a given QName that has an attribute with a given QName, (p) for constructing ELEMENT-ATTRIBUTE-VALUE-DESCENDANT queries that specify a search within the set of descendants of an element with a given QName that has an attribute with a given QName, such that the attribute text exactly matches a given phrase, (q) for constructing URI queries that specify a search within the set of documents matching a given URI string.

A QName is a 'Qualified Name', which means a name of the form 'prefix:name', where prefix maps to some names pace URI, and name is any well-formed element or attribute name.

In one embodiment, complex text search queries are assembled by composition of the 'and-query', 'or-query' and 'and-not-query' functions. The value of these functions is a 'query value', which represents a specification of a search pattern, which may be stored and evaluated at some subsequent point in the processing performed by XQE 200. The query value represents a delayed evaluation—the query value specification determines a set of element sub-tree ids, but does not actually extract them from the database until passed to a function 'search'. The function 'search' may take two arguments: a query value and an element QName, and evaluate the query specified by the query value argument returning a sequence of element sub-tree ids as specified by the QName argument. The QName argument may be an ancestor (or self) of the nodes returned by the query value specification.

In one embodiment, the sequence of nodes returned by the function search may be ordered by a 'relevance' score. The relevance of a node to the specified query is a complex function that depends on the frequency the query terms appear in the text of the query nodes, the frequency the query terms appear across the entire database, and the quality score attached to a given node. The quality score is further described in Linblad IV-A.

In one embodiment, XQE 200 calculates the relevance of a node relative to any of the previously described precomputed text queries as the stored 'score' value in the PostingList. Scores are composed through and-query's and or-query's by summation. The function and-query takes a sequence of any number of query values as an argument and returns a query value specifying a search matching all of the argument queries. The function or-query takes a sequence of any number of query values as an argument and returns a query value specifying a search matching any one of the argument queries. The function and-not-query takes two query value arguments and returns a query value specifying a search matching the first but not the second argument query. Complex queries may be built by successive application of and-query, or-query and and-not-query. For example, and-query(or-query((element-word-query(QName("A"), "best"), element-word-query(QName("A"), "worst"))), element-word-query("A", "times")), specifies a query for elements labeled "A", containing the term "times" and either one of the terms "best" or "worst". In addition, each of the query value functions can accept an argument specifying a relative weight for the query as a constituent of the composed query. For example, and-query(or-query((element-word-query(QName("A"), "best", 0.7), element-word-query(QName("A"), "worst", 0.4))), element-word-query("A", "times", 0.9))

specifies a query for elements labeled "A", containing the term "times" and either one of the terms "best" or "worst", with the appearance of "worst" given relative weight 0.4, the appearance of "best" a relative weight of 0.7, and the appearance of "times" given a relative weight of 0.9. The relative weights are used when assigning an ordering to the result of a query.

Embodiments of the present invention provide methods for generating a pre-computed index that is used for generating a result for a query. Step queries are pre-computed and the results to these step queries generated and stored in the index along with the step queries. The step queries include a set of elements that are related in a parent-child relationship and may be used to generate a result for a query. Embodiments of the present invention receive a query and break the query into multiple step queries using elements from the path of the query. Results from these step queries are then retrieved from the index and the intersection of the retrieved results is taken to generate a result for the query. The result yields a location or elements that satisfy the query.

In one embodiment, relationships among elements in XML documents are computed and possible step queries that may be generated from the XML documents are computed. Because these step queries are pre-computed, XQueries that include the pre-computed step queries are satisfied in an efficient manner. Instead of traversing the hierarchical structure of the XML document on a node-by-node basis to find an element of the document, an index of pre-computed results for step-queries is used to generate a result for the query.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method for searching a document store of electronically stored structured documents and for generating a result for a query of the document store for one or more document of elements, using pre-computed step queries and pre-computed step query results stored in a computer-readable database, using a processor configured to access the computer-readable database, the method comprising:

using the processor, receiving the query, wherein the query is a computer-readable data sequence representing a path of elements in the document of elements;

using the processor, generating a plurality of step queries from the query, wherein a step query comprises a relationship between a plurality of elements determined from a part of the path of elements;

using the processor, for each of the plurality of step queries, accessing the computer-readable database and retrieving a pre-computed step query result for a step query in the plurality of step queries by querying the computer-readable database using the step query as a query to a query engine, wherein the step query corresponds to a pre-computed step query for the pre-computed step query result; and using the processor, generating the result for the query using the step query results.

2. The method of claim 1, wherein generating the result comprises taking the intersection of the step query results.

3. The method of claim 1, wherein the result of the query comprises a location in the document of elements that includes the path of elements for the query.

4. The method of claim 1, wherein the result of the query comprises the path of elements for the query.

5. The method of claim 1, further comprising optimizing the query, wherein optimizing the query comprises generating sequences from the path of elements that interpolate the path.

6. The method of claim 1, wherein the plurality of step queries comprise at least one of a one-step query, two-step query, three-step query, and four-step query.

7. The method of claim 1, wherein reducing the query into the plurality of step queries comprises reducing the query into at least one two-step query.

8. The method of claim 1, wherein reducing the query into the plurality of step queries comprises reducing the query into at least one three-step query.

9. The method of claim 1, further comprising
computing a hash key for queries in the pre-computed step queries and plurality of step queries; and
storing the hash keys for the pre-computed step queries and the corresponding pre-computed step query results in the database.

10. The method of claim 9, wherein retrieving the pre-computed step query result comprises using the stored hash keys for the step queries to retrieve the pre-computed step query results corresponding to the hash keys.

11. The method of claim 9, wherein the step query results comprise a ID for one or more elements in the document of elements.

12. The method of claim 9, further comprising post-processing the intersection of the step query results to generate the result for the query.

13. The method of claim 12, wherein post-processing the result comprises matching each step query in the step query results to the query.

14. The method of claim 9, wherein the relationship between the plurality of elements comprises a parent/child relationship.

15. The method of claim 9, wherein the document of elements comprises an XML document.

16. The method of claim 9, wherein elements in the document of elements comprise at least one of element, word, attribute, and string elements.

17. A computer-implemented method for creating a computer-readable database of step queries and step query results for a structured document of elements using a processor, the method comprising:

determining relationships between a plurality of elements from the structured document of elements:

generating step queries from the relationships;

generating step query results for the step queries, wherein a step query result for a step query corresponds to one or more elements in the structured document of elements for the step query; and storing the step queries and corresponding step query results in the computer-readable database, wherein the stored step query results are usable to generate a result for a main query, wherein the main query can be reduced to a plurality of step queries that correspond to the stored step queries.

18. The method of claim 17, further comprising generating an index for the step queries, the index pointing to the corresponding step query results for each step query.

19. The method of claim 17, wherein the step query results comprise an ID for one or more elements in the document of elements.

20. The method of claim 17, wherein the plurality of step queries and corresponding step query results are stored in a PostingList.

* * * * *